F. GLEICH.
BLOWPIPE.
APPLICATION FILED JULY 18, 1913.
1,102,984.
Patented July 7, 1914.
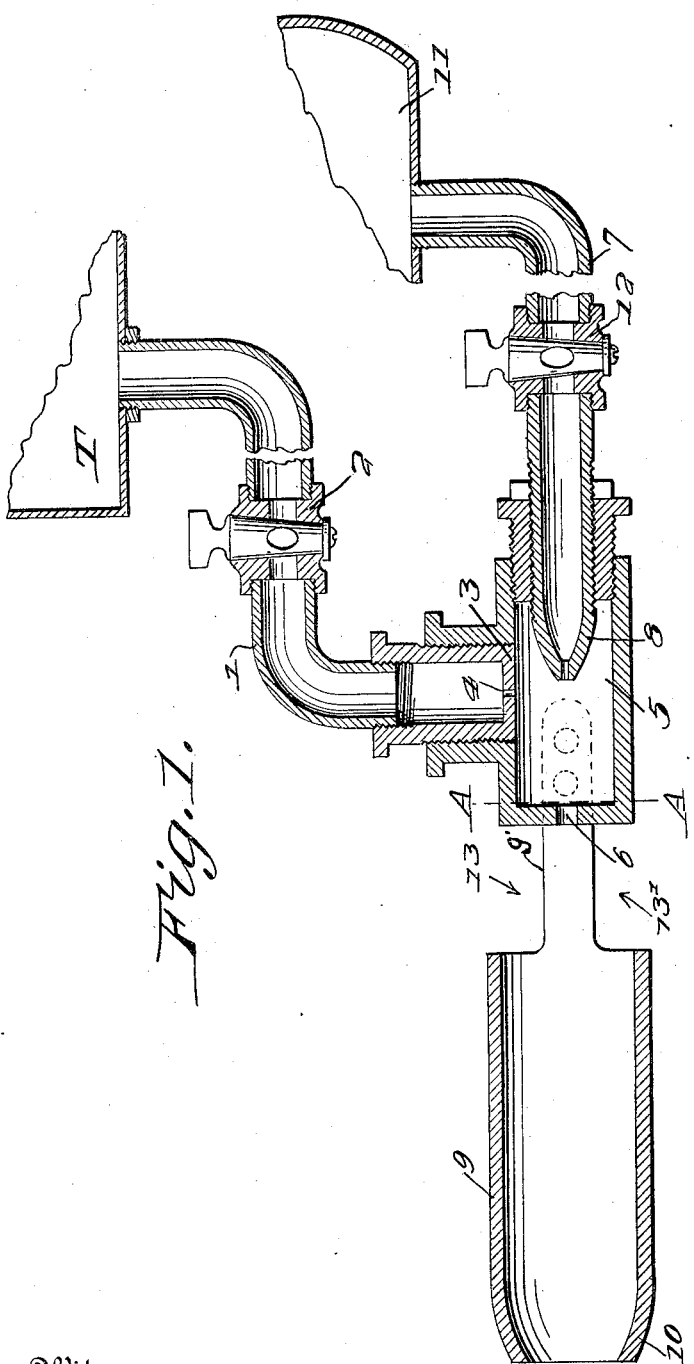
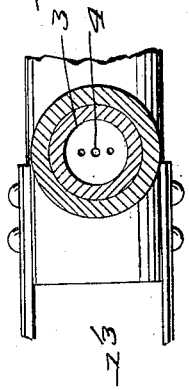
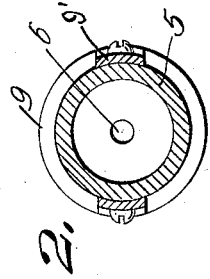
Witnesses
H. W. Schrufer.
J. F. Hayes
Inventor
Franklin Gleich
Geo. W. Upton.
Attorney

UNITED STATES PATENT OFFICE.

FRANKLIN GLEICH, OF ALLIANCE, OHIO.

BLOWPIPE.

1,102,984. Specification of Letters Patent. Patented July 7, 1914.

Application filed July 18, 1913. Serial No. 779,849.

*To all whom it may concern:*

Be it known that I, FRANKLIN GLEICH, a citizen of the United States of America, residing at Alliance, in the county of Stark and State of Ohio, have invented certain new and useful Improvements in Blowpipes, of which the following is a specification.

My invention relates to improvements in blow pipes in which a stream of air is conjoined with a small, even flow of a combustible fluid or gas to produce an exceedingly hot flame for soldering, welding or brazing.

My improvement can be used to advantage with any combustible fluid or gas, but is especially effective when used with crude oil which is a preferred element because of its cheapness.

I attain the result described by the mechanism illustrated in the accompanying drawings, in which—

Figure 1 represents the entire invention in longitudinal section; Fig. 2, represents a cross section taken through the line A. A. of Fig. 1, and Fig. 3 shows a detail.

Similar numerals refer to like parts throughout the several views.

A tank T is filled with oil and is connected by a pipe or tube 1, to an inclosed mixing chamber 5. A valve 2, which may be operated as a globe valve or as a pet cock or in any well known way to regulate the flow of oil, is located in the tube 1 between the tank T. and the chamber 5.

In the entering end 3 of the tube 1, which may be adjustably threaded into the top of the chamber 5, I puncture one or more small holes 4 through which a suitable amount of oil may drop or be drawn by a longitudinal air blast.

To one end of the chamber, 5, I adjustably attach a tube or pipe 7 which leads to a source of compressed air or a blower 11 and is provided, between the chamber 5 and the blower 11 with any form of regulating valve, globe, or pet cock 12 to control the volume and force of the air current as it passes the holes 4 at the end of the tube 1, within the chamber 5, and has its entering end 8 reduced in diameter and threaded to permit of longitudinal movement to regulate the perfect mixing of oil and air according to the grade of oil used.

I find it advantageous to partly close the other end of the chamber 5 by sealing it up and boring an opening, 6, therein of diameter less than that of the chamber 5. Through the opening 6 the blast of air from the blower 11 carries the oil from the holes 4 in a fine spray to the open air, where it may be ignited as with a match.

By means of fastening arms 9′ I attach to the open end of the chamber 5 and in front of the opening 6 a tubular nozzle 9, as large in interior diameter as the interior of chamber 5, at least, preferably, and slightly reduced in diameter at its farther end 10, to guide the exit flame to a point, and so formed as to leave large open air spaces 13, 13′ between its mouth and the opening 6 of the chamber 5.

While the device described can be rigidly mounted for shop work, in practice ordinarily the tank T. may be made as a portable part of the mechanism or be connected by a flexible tube 1, as by a hose for example and the pipe 7 may be flexible, as is a hose, so that the end 10 can be brought to and be pointed at and on the material to be soldered, brazed, welded or repaired: thus affording a most convenient hand tool for repairs to all kinds of mechanisms and for the conjunction of metal parts ordinarily in inaccessible locations.

I claim:—

A blow pipe comprising in combination, a mixing chamber having threaded openings therein for the insertion of oil and air supply tubes, and a reduced discharge orifice in one end thereof; an adjustable and regulated oil supply tube threaded into one of said openings, said tube having a closed end with small discharge orifices therein leading into said mixing chamber, a longitudinally adjustable and regulated air supply tube inserted into the other of said mixing chamber openings; and a flame directing device having a reduced nozzle end, and so constructed as to form an auxiliary air mixing chamber between said device and said mixing chamber, said device being attached to the front of the discharge orifice of said mixing chamber.

In testimony whereof I affix my signature in presence of two witnesses.

FRANKLIN GLEICH.

Witnesses:
H. H. EMMONS,
C. W. PAXSON.

Copies of this patent may be obtained for five cents each, by addressing the "Commissioner of Patents, Washington, D. C."